(12) United States Patent
Kume

(10) Patent No.: US 10,807,251 B2
(45) Date of Patent: Oct. 20, 2020

(54) ROBOT WRIST STRUCTURE

(71) Applicant: Fanuc Corporation, Yamanashi (JP)

(72) Inventor: Hirokazu Kume, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 86 days.

(21) Appl. No.: 16/363,241

(22) Filed: Mar. 25, 2019

(65) Prior Publication Data

US 2019/0315001 A1 Oct. 17, 2019

(30) Foreign Application Priority Data

Apr. 11, 2018 (JP) .................. 2018-076117

(51) Int. Cl.
| | | |
|---|---|---|
| *B25J 17/02* | (2006.01) | |
| *B25J 9/12* | (2006.01) | |
| *F16H 19/00* | (2006.01) | |

(52) U.S. Cl.
CPC ........... *B25J 17/0258* (2013.01); *B25J 9/126* (2013.01); *F16H 19/005* (2013.01)

(58) Field of Classification Search
CPC .... B25J 17/0258; B25J 9/126; B25J 19/0025; B25J 19/0029; B25J 19/0041; F16H 19/005

(Continued)

(56) References Cited

U.S. PATENT DOCUMENTS

| | | | |
|---|---|---|---|
| 5,178,031 A * | 1/1993 | Orsi ....................... | B25J 9/1025 318/568.11 |
| 5,949,009 A | 9/1999 | Chen | |
| 5,949,209 A | 9/1999 | Okamoto et al. | |
| 8,291,789 B2 * | 10/2012 | Long .................... | B25J 17/0283 74/490.05 |
| 8,910,538 B2 * | 12/2014 | Hayashi ................... | B25J 9/046 74/490.05 |
| 8,960,042 B2 * | 2/2015 | Liu .......................... | B25J 9/104 74/490.05 |

(Continued)

FOREIGN PATENT DOCUMENTS

| | | |
|---|---|---|
| CN | 103419195 A | 12/2013 |
| EP | 1457295 A1 | 9/2004 |

(Continued)

OTHER PUBLICATIONS

Matsuura, Yo; Decision to Grant a Patent; Japanese Application No. 2018-076117; dated Jun. 2, 2020; 3 pages.

(Continued)

*Primary Examiner* — Jake Cook
*Assistant Examiner* — Gregory Robert Weber
(74) *Attorney, Agent, or Firm* — Shackelford, Bowen, McKinley & Norton, LLP

(57) ABSTRACT

Provided is a robot wrist structure provided with a first wrist element, a second wrist element, and a third wrist element. The first wrist element is provided with a casing having a hollow structure, two driving motors that drive the second wrist element and the third wrist element, and a conduit member that allows wiring to pass therethrough from an arm-side to a second-wrist-element-side in a direction along a first axis. A first opening and a second opening are provided in a first side wall and a second side wall that are positioned on either side of a reference plane. The first opening is large enough to allow the driving motors to pass therethrough. Centers of rotation shafts of the two driving motors are disposed between the first side wall and the reference plane. The conduit member is disposed between the second side wall. The wiring bypasses the driving motors.

7 Claims, 15 Drawing Sheets

(58) Field of Classification Search
USPC .............. 74/490.02, 490.03, 490.04, 490.05, 74/490.06
See application file for complete search history.

(56) References Cited

U.S. PATENT DOCUMENTS

| | | | |
|---|---|---|---|
| 2004/0261562 A1* | 12/2004 | Haniya | B25J 17/0283 74/490.02 |
| 2005/0103148 A1* | 5/2005 | Inoue | B25J 19/0029 74/490.02 |
| 2008/0016979 A1* | 1/2008 | Yasumura | B25J 9/0009 74/490.03 |
| 2010/0000364 A1 | 1/2010 | Kagawa et al. | |
| 2010/0229671 A1* | 9/2010 | Haniya | B25J 17/0283 74/490.02 |
| 2013/0255429 A1* | 10/2013 | Hahakura | B25J 17/00 74/490.05 |
| 2013/0305869 A1 | 11/2013 | Krumbacher | |
| 2014/0020498 A1* | 1/2014 | Adachi | B25J 18/00 74/490.02 |
| 2014/0102240 A1 | 4/2014 | Inada et al. | |
| 2015/0013491 A1* | 1/2015 | Mori | B25J 17/0258 74/490.03 |
| 2015/0114162 A1* | 4/2015 | Kirihara | H01R 12/613 74/490.02 |
| 2016/0114491 A1* | 4/2016 | Lee | B25J 19/0029 74/490.06 |

FOREIGN PATENT DOCUMENTS

| | | |
|---|---|---|
| EP | 1531029 A1 | 5/2005 |
| EP | 2105265 A1 | 9/2009 |
| EP | 2502715 A1 | 9/2012 |
| EP | 2711145 A1 | 3/2014 |
| JP | H04-105888 A | 4/1992 |
| JP | H04-310391 A | 11/1992 |
| JP | H08-290385 A | 11/1996 |
| JP | H10-138190 A | 5/1998 |
| JP | 2003-200376 A | 7/2003 |
| JP | 2004-358649 A | 12/2004 |
| JP | 2005-144610 A | 6/2005 |
| JP | 2012-240123 A | 12/2012 |
| JP | 2014-018929 A | 2/2014 |
| JP | 5833836 B2 | 12/2015 |
| JP | 2016-074067 A | 5/2016 |
| JP | 2016-107355 A | 6/2016 |
| JP | 2017-035746 A | 2/2017 |
| JP | 6163999 B2 | 7/2017 |
| WO | WO-2008084737 A1 | 7/2008 |

OTHER PUBLICATIONS

Industrial Property Cooperation Center; Search Report by Registered Search Organization; Japanese Patent Application No. 2018-076117; dated May 22, 2020; 14 pages.

* cited by examiner

ROBOT WRIST STRUCTURE

CROSS-REFERENCE TO RELATED APPLICATIONS

This application is based on Japanese Patent Application No. 2018-076117, the contents of which are incorporated herein by reference.

TECHNICAL FIELD

The present invention relates to a robot wrist structure.

BACKGROUND ART

In the related art, as a wrist structure that is attached to a tip of an arm of a robot, there is a known structure having, built thereinto, driving motors for two axes at the tip and a wiring conduit member for guiding the wiring to a tip of the wrist from the arm (for example, see Patent Publication of Japanese Patent No. 5833836).

With the wrist structure of Publication of Japanese Patent No. 5833836, the conduit member is disposed straight along an axis about which the wrist is rotated with respect to the arm, and the two driving motors are disposed at positions at which the conduit member is sandwiched therebetween.

SUMMARY OF INVENTION

An aspect of the present invention is robot wrist structure including: a first wrist element that is supported at a tip of an arm of a robot in a rotatable manner about a first axis; a second wrist element that is supported at a tip of the first wrist element in a rotatable manner about a second axis that intersects the first axis; and a third wrist element that is supported at a tip of the second wrist element in a rotatable manner about a third axis that intersects the second axis, wherein the first wrist element is provided with a casing having a hollow structure, two driving motors that are accommodated in an internal space of the casing and that drive the second wrist element and the third wrist element, and a conduit member that allows, in the internal space, wiring to pass therethrough from an arm side to a second-wrist-element side in a direction along the first axis, a first opening and a second opening through which the internal space reaches the exterior are provided in a first side wall and a second side wall that are positioned on either side of a plane including the first axis and the second axis of the casing, the first opening is large enough to allow the driving motors to pass therethrough, centers of rotation shafts of the two driving motors are disposed between the first side wall and the plane, and the conduit member is disposed between the second side wall and the driving motor, and disposes the wiring in a curved route that bypasses the driving motors.

In the above-described aspect, portions of the driving motors may be disposed between the plane and the second side wall.

In the above-described aspect, an area in the vicinity of the center of internal space may be included in a region that includes the two the driving motors and a region sandwiched between the two driving motors.

In the above-described aspect, at least portions of the two driving motors may be disposed so as to overlap in a first-axis direction.

In the above-described aspect, the casing may support the second wrist element in a rotatable manner at two ends thereof in a second-axis direction.

In the above-described aspect, a third side wall and a fourth side wall that are positioned on two sides of the casing in the second-axis direction may each be provided with an attachment surface to which one of the driving motors is attached, a through-hole through which the rotation shaft thereof passes, and a machining opening that is provided at a position facing the attachment surface for machining the attachment surface.

In the above-described aspect, a pulley around which a belt for driving the second wrist element or the third wrist element is wound may be secured to the rotation shaft of at least one of the driving motors, a position of the driving motor can be adjusted in directions in which a tensile force applied to the belt along the attachment surface is changed, and the driving motor may be provided with an interface that allows a position-adjusting fixture to be attached to the driving motor via the machining opening formed in the side wall that is the same as that provided with the attachment surface.

DESCRIPTION OF EMBODIMENT

A wrist structure 1 of a robot 100 according to an embodiment of the present invention will be described with reference to drawings.

Figure 1:
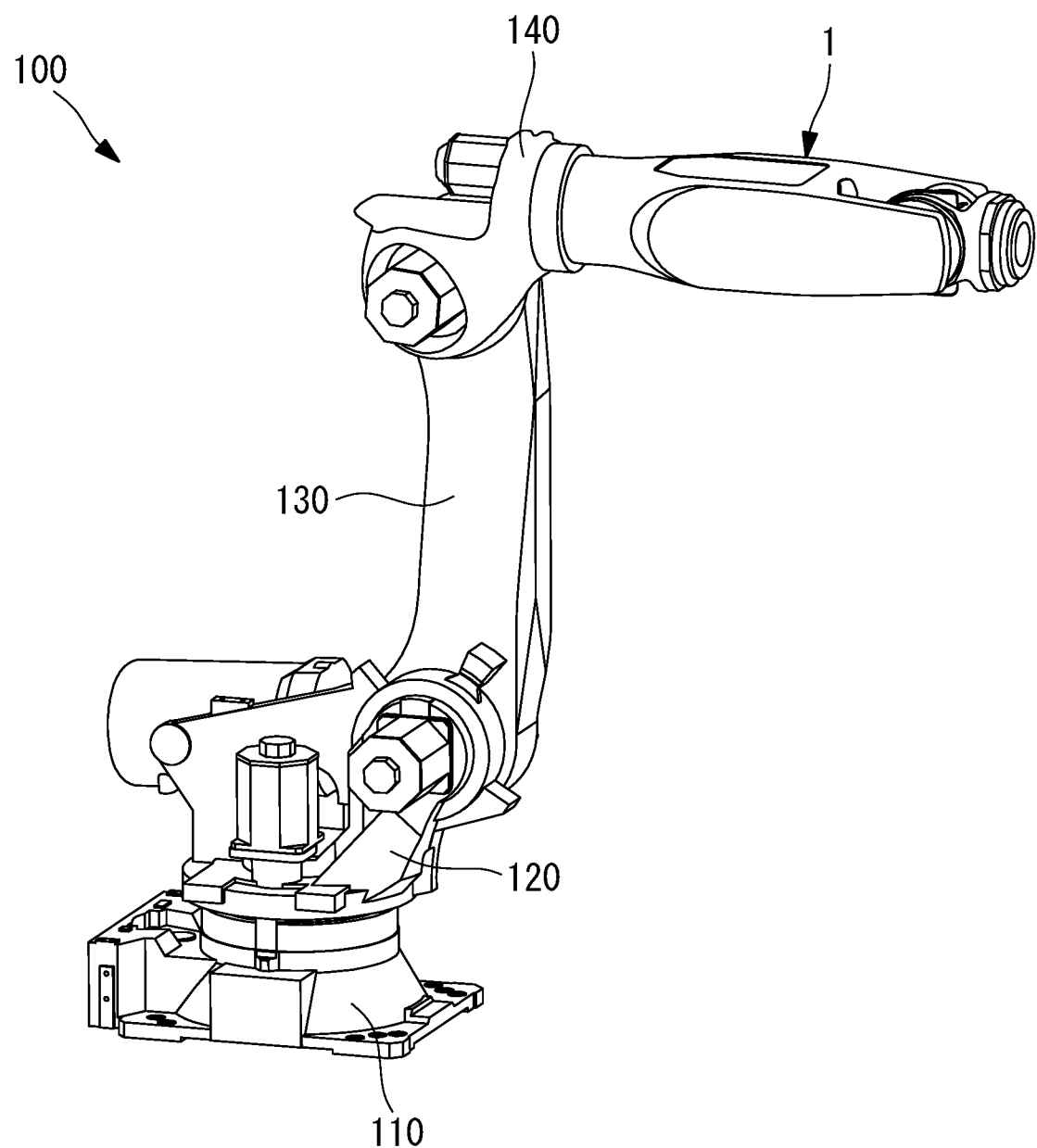
FIG. 1 is a perspective view showing a robot provided with a wrist structure according to an embodiment of the present invention.

As shown in FIG. 1, the robot 100 provided with the wrist structure 1 according to this embodiment is, for example, a six-axis articulated type robot provided with: a base 110 that is installed on the ground; a turning body 120 that rotates about a vertical axis with respect to the base 110; a first arm 130 that pivots about a horizontal axis with respect to the turning body 120; a second arm (arm) 140 that pivots about the horizontal axis with respect to the first arm 130; and the wrist unit (wrist structure) 1 that is attached to a tip of the second arm 140.

Figure 2:
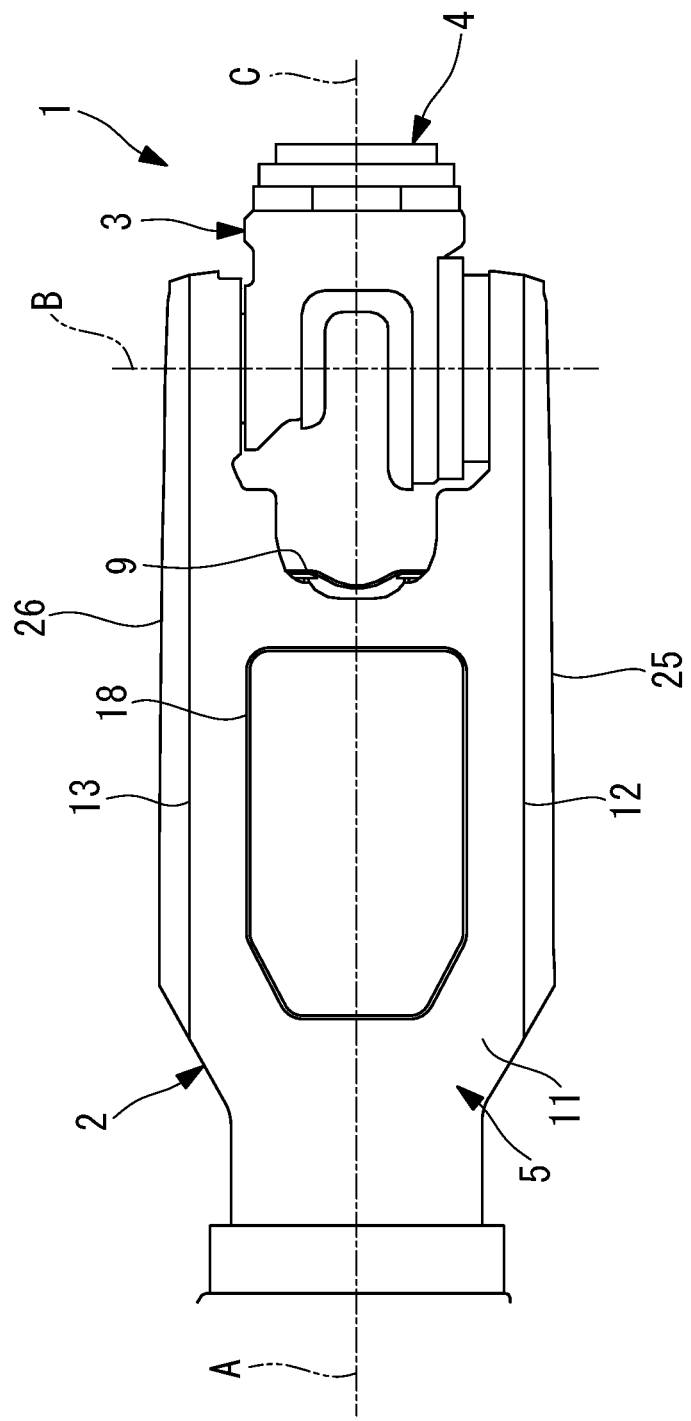
FIG. 2 is a diagram showing the wrist structure in FIG. 1.

As shown in FIG. 2, the wrist unit 1 is provided with: a first wrist element 2 that is supported so as to be rotatable about a first axis A with respect to the second arm 140; a second wrist element 3 that is supported so as to be rotatable about a second axis B, which is orthogonal to the first axis A, with respect to the first wrist element 2; and a third wrist element 4 that is supported so as to be rotatable about a third axis C, which is orthogonal to the second axis B and passes through the intersect of the first axis A and the second axis B, with respect to the second wrist element 3.

Figure 3:
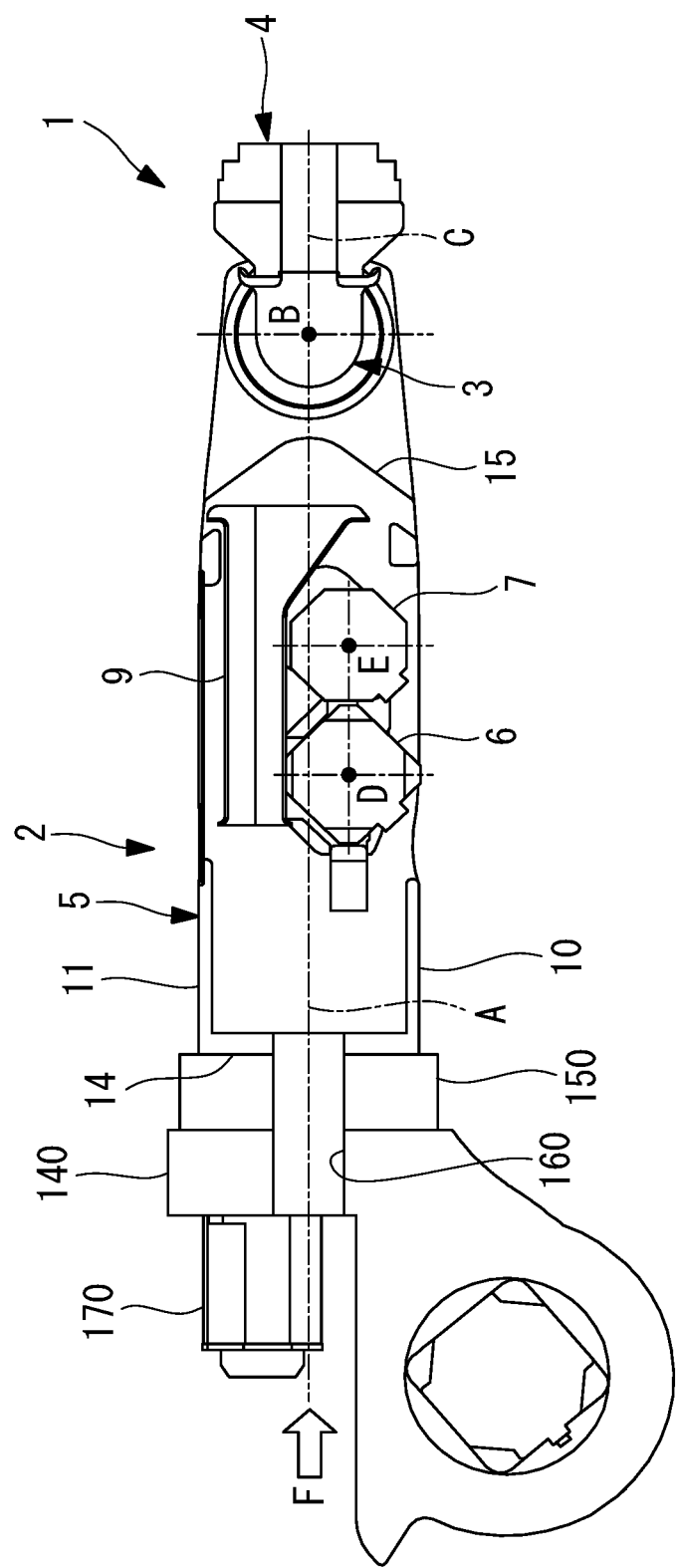
FIG. 3 is a longitudinal cross-sectional view showing the wrist structure in FIG. 1.

As shown in FIG. 3, the first wrist element 2 is provided with: a first casing (casing) 5 having a hollow structure; two driving motors 6 and 7 that are accommodated in an internal space of the first casing 5; and a conduit member 9 that allows wiring (see FIG. 10) 8 to pass through the internal space.

Figure 4:
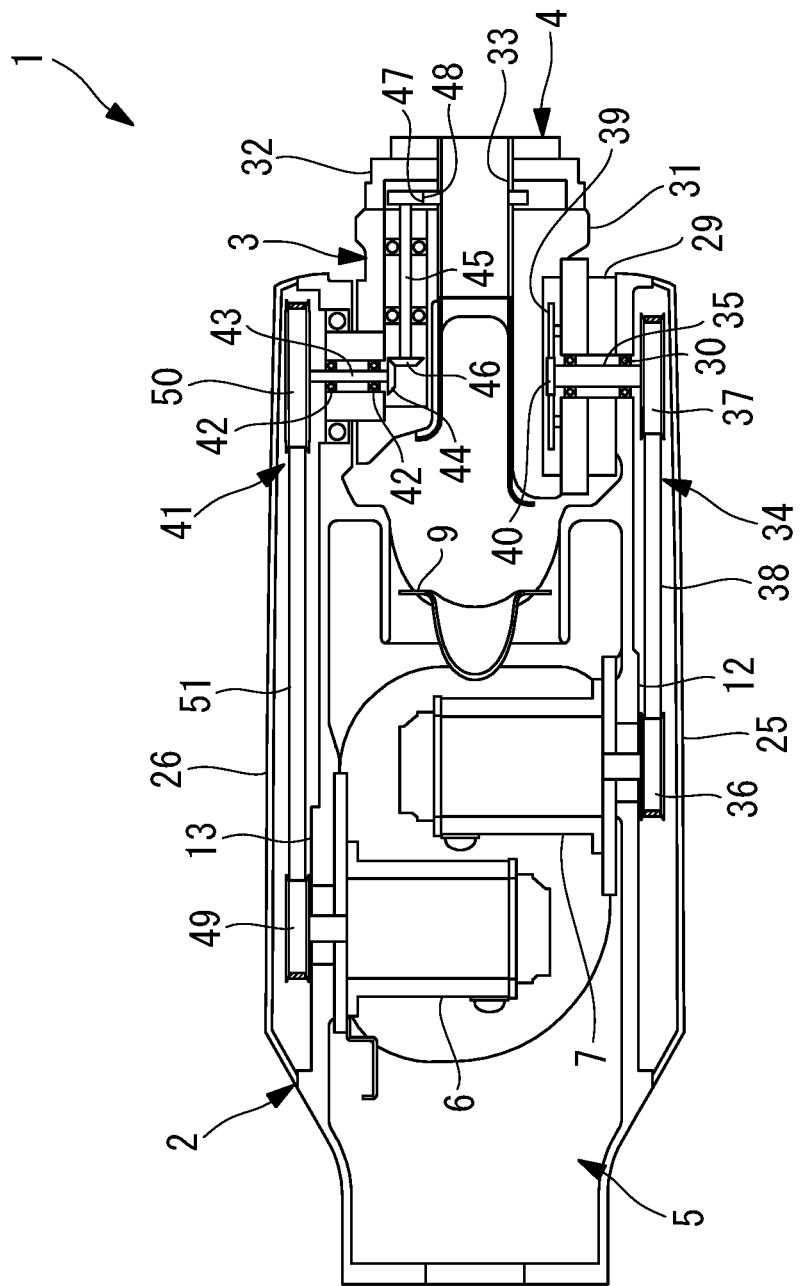
FIG. 4 is a longitudinal cross-sectional view taken along a reference plane of the wrist structure in FIG. 1.

The first casing 5 is a box-like single component provided with: a first side wall 10 and a second side wall 11 that are disposed on either side of a plane (hereinafter referred to as the reference plane F) containing the first axis A and the second axis B, as shown in FIG. 3; a third side wall 12 and a fourth side wall 13 that are positioned on two sides in a second-axis-B direction, as shown in FIG. 4; and a fifth side wall 14 and a sixth side wall 15 that are positioned on two sides in a first-axis-A direction, as shown in FIG. 3, and defines the internal space surrounded by these six side walls 10, 11, 12, 13, 14, and 15.

Figure 5:
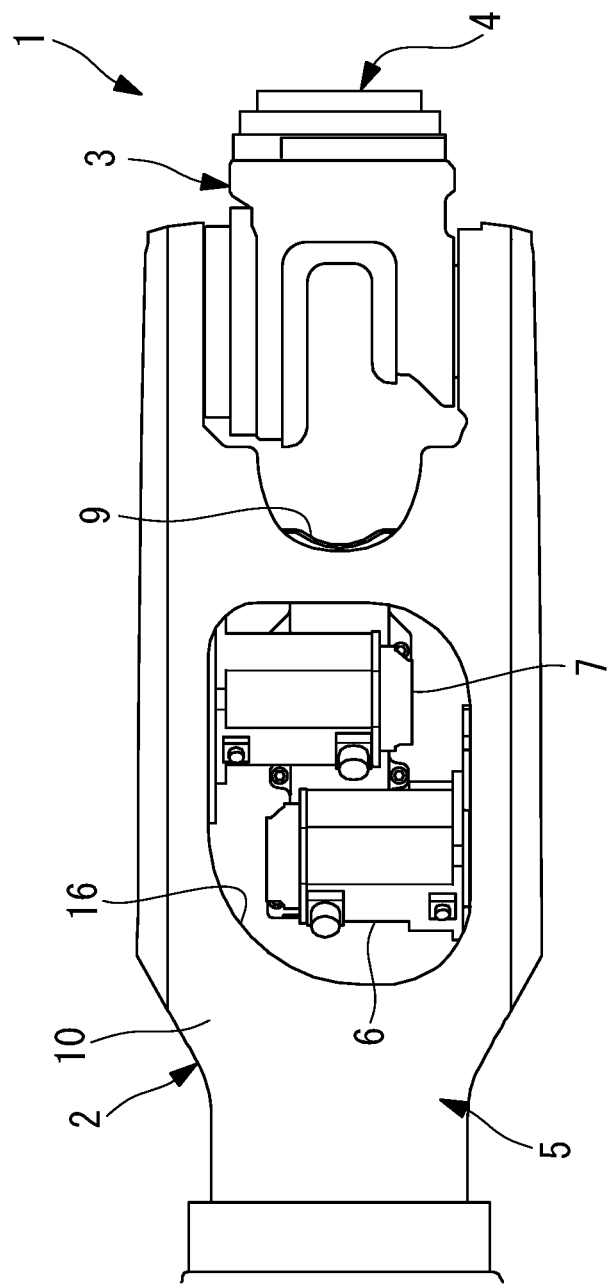
FIG. 5 is a diagram in which the wrist structure in FIG. 2 is viewed from the rear side with a cover removed.
Figure 6:
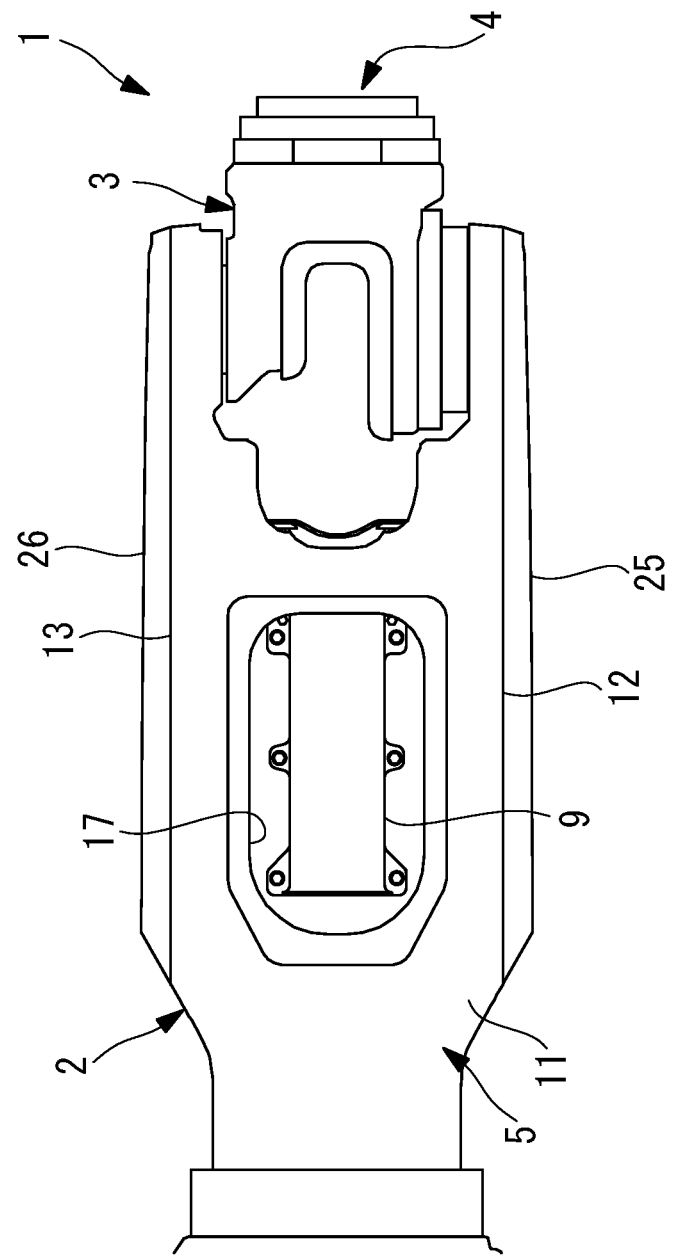
FIG. 6 is a diagram in which the cover of the wrist structure in FIG. 2 is removed.

As shown in FIG. 5, the first side wall 10 is provided with a first opening 16 through which the internal space reaches the exterior. As shown in FIG. 6, the second side wall 11 is provided with a second opening 17 through which the internal space reaches the exterior. The first opening 16 has a large enough size to allow the driving motors 6 and 7 to pass therethrough. As shown in FIG. 2, the first opening 16 and the second opening 17 are individually closed up by covers 18 that can be attached thereto/detached therefrom.

As shown in FIG. 2, portions of the third side wall 12 and the fourth side wall 13 extend, toward the tip, farther out than the sixth side wall 15 does, form a bifurcated shape, and support the second wrist element 3, which is inserted therebetween, in a rotatable manner on either side thereof in the second-axis-B direction. By doing so, the second wrist element 3 is supported with respect to the first casing 5 with high rigidity by means of the structure in which both sides thereof are supported.

Figure 7:
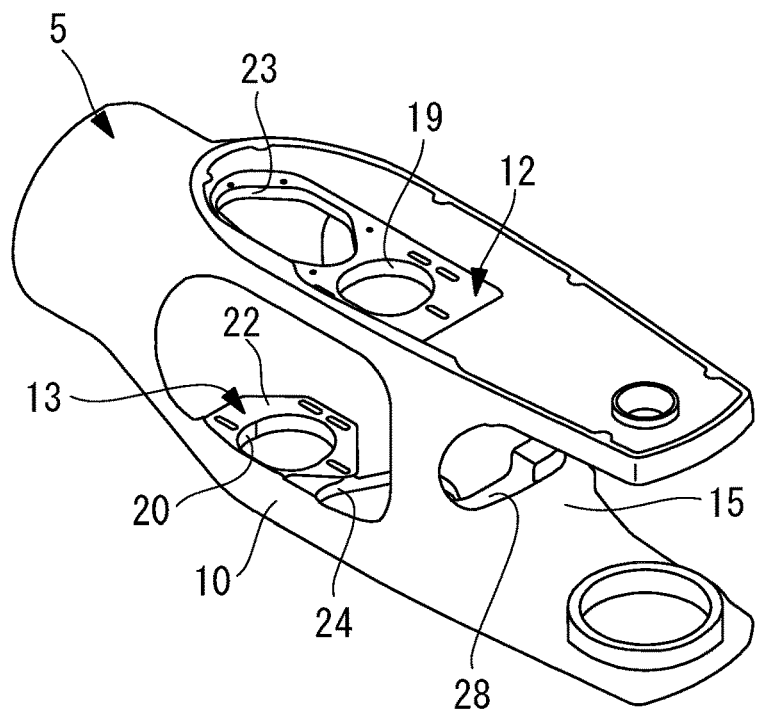
FIG. 7 is a perspective view showing a first casing of the wrist structure in FIG. 2.
Figure 8:
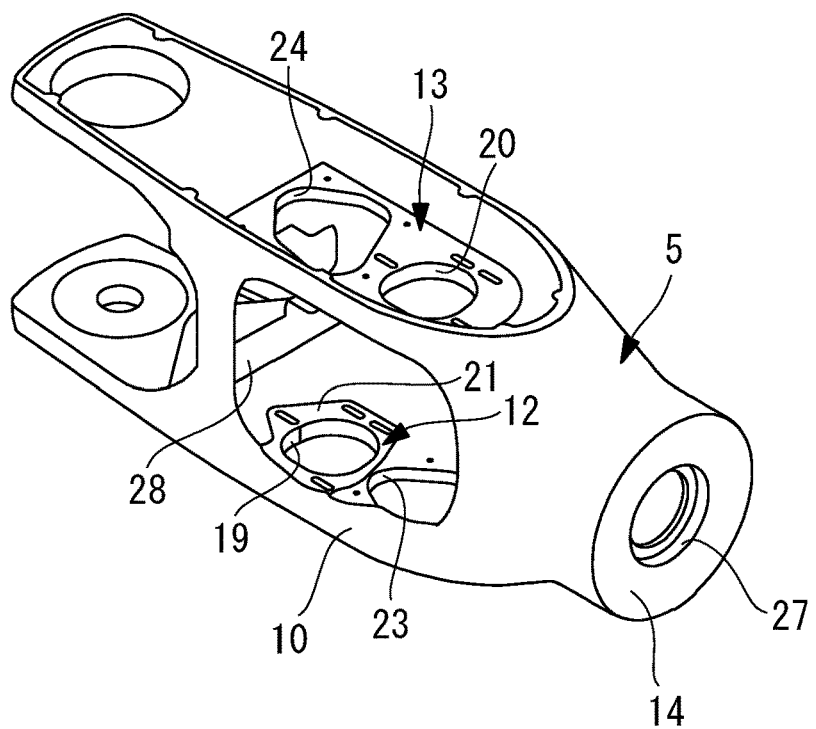
FIG. 8 is a perspective view in which the first casing in FIG. 7 is viewed from a different direction.

As shown in FIGS. 7 and 8, the third side wall 12 and the fourth side wall 13 are individually provided with: through-holes 19 and 20 through which rotation shafts D and E of the driving motors 6 and 7 pass from the internal-space side of the first casing 5; and attachment surfaces 21 and 22 for the driving motors 6 and 7 are formed in inner surfaces in peripheries of the through-holes 19 and 20.

As shown in FIG. 4, the through-holes 19 and 20 and the attachment surfaces 21 and 22 of the third side wall 12 and the fourth side wall 13 are provided at positions at which the rotation shafts D and E of the two driving motors 6 and 7 are attached next to each other in the first-axis-A direction, being disposed in opposing directions and parallel to each other. In other words, as shown in FIGS. 7 and 8, the through-holes 19 and 20 and the attachment surfaces 21 and 22 of the third side wall 12 and the fourth side wall 13 are disposed at positions that are displaced in the first-axis-A direction.

As shown in FIG. 7, the third side wall 12 is provided, at a position facing the attachment surface 22 in the fourth side wall 13 in the second-axis-B direction, with a machining opening 23 for machining the attachment surface 22 on the inner surface of the fourth side wall 13. As shown in FIG. 8, the fourth side wall 13 is provided, at a position facing the attachment surface 21 on the third side wall 12 in the second-axis-B direction, with a machining opening 24 for machining the attachment surface 21 on the inner surface of the third side wall 12. By doing so, the through-hole 19 of the third side wall 12 and the machining opening 23 are disposed next to each in a direction along the first axis A, and the through-hole 20 of the fourth side wall 13 and the machining opening 24 are disposed next to each other in a direction along the first axis A.

As shown in FIGS. 2 and 4, covers 25 and 26 that define spaces in which a motive-power transmitting mechanism 34, described later, is accommodated are attached outside the third side wall 12 and the fourth side wall 13 in an attachable/detachable manner.

The attachment surfaces 21 and 22 of the third side wall 12 and the fourth side wall 13 are provided at positions that are displaced toward the first side wall 10 with respect to the reference plane F. By doing so, with the driving motors 6 and 7 attached to the individual attachment surfaces 21 and 22, the centers of the rotation shafts D and E are disposed between the reference plane F and the first side wall 10, as shown in FIG. 3. The driving motors 6 and 7 are disposed at positions at which portions thereof protrude farther out into the second side wall 11 with respect to the reference plane F instead of being disposed in their entirety between the reference plane F and the first side wall 10.

In the internal space of the first casing 5, a space is formed between the driving motors 6 and 7 and the second side wall 11 as a result of the two driving motors 6 and 7 being disposed at the positions displaced toward the first side wall 10, and the conduit member 9 is disposed in the internal space by utilizing this space.

Specifically, as shown in FIG. 3, the conduit member 9 is formed in a straight pipe shape, and is secured in a space between the driving motors 6 and 7 and the second side wall 11 with the longitudinal axis thereof being parallel to the first axis. A tip side of the conduit member 9 is expanded toward the tip. The conduit member 9 is formed of, for example, a material having a low coefficient of friction such as a resin. Alternatively, a member in which a liner or a coating composed of a material having a low coefficient of friction is formed on an inner surface of a metal may be employed.

Examples of wiring 8 to be passed through the interior of the conduit member 9 include an electrical cable that supplies power to a tool to be attached to the third wrist element 4, a pipe that supplies a fluid, and an elastically deformable elongated member such as a welding wire.

Figure 9:
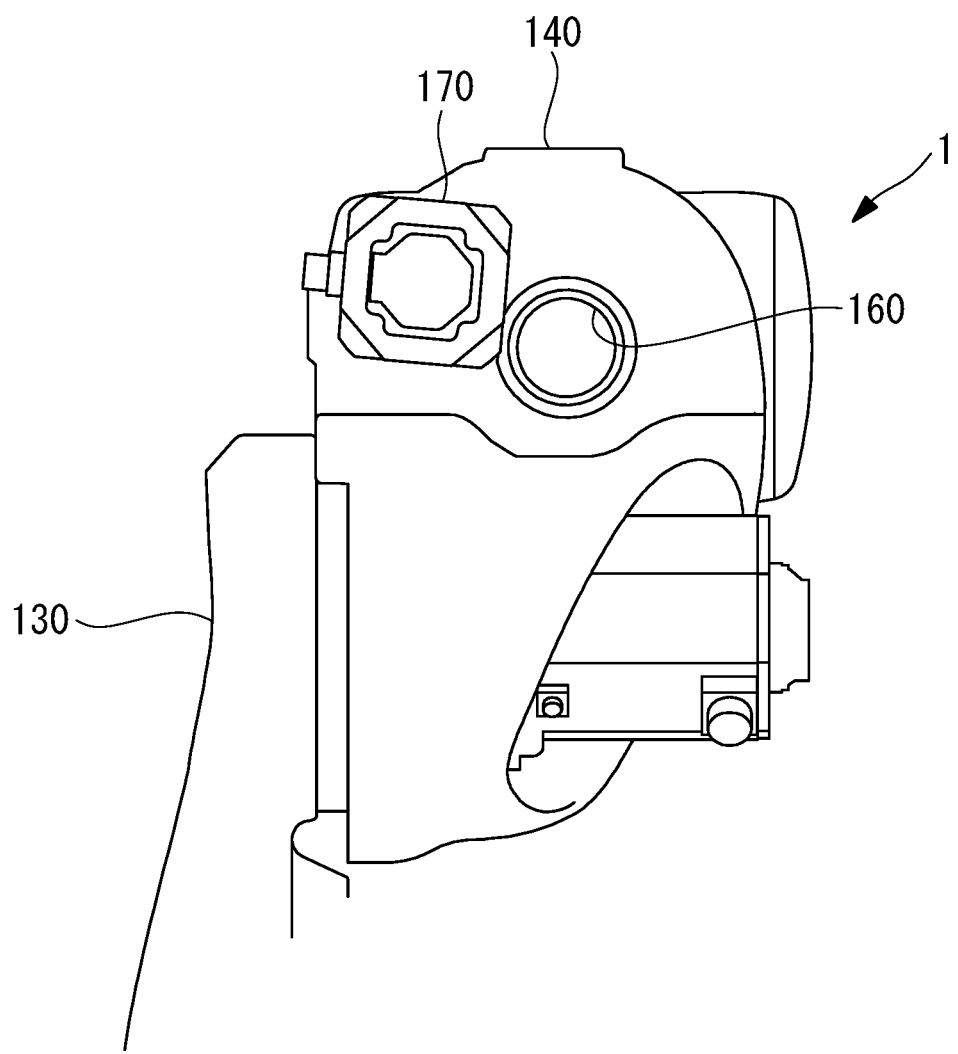
FIG. 9 is a partial view of the robot in FIG. 1 in which a second arm thereof is viewed from the back side.

The fifth side wall 14 is formed in a circular shape, as shown in FIG. 8, and is secured to an output shaft of a reducer 150 secured to the second arm 140, as shown in FIG. 3. As shown in FIGS. 3 and 9, in the second arm 140 and the reducer 150, a hollow portion 160 that passes straight therethrough along the first axis A is formed in an area surrounding the first axis A from the back side of the second arm 140. In FIG. 3, the reference sign 170 indicates a driving motor that supplies the reducer 150 with a driving force that causes the first wrist element 2 to be rotationally driven about the first axis A. As shown in FIG. 8, the fifth side wall 14 is provided, in the area surrounding the first axis A, with a through-hole 27 that is connected to the hollow portion 160 of the reducer 150. As shown in FIG. 7, the sixth side wall 15 is also provided with a through-hole 28 in the area surrounding the first axis A.

Figure 10:
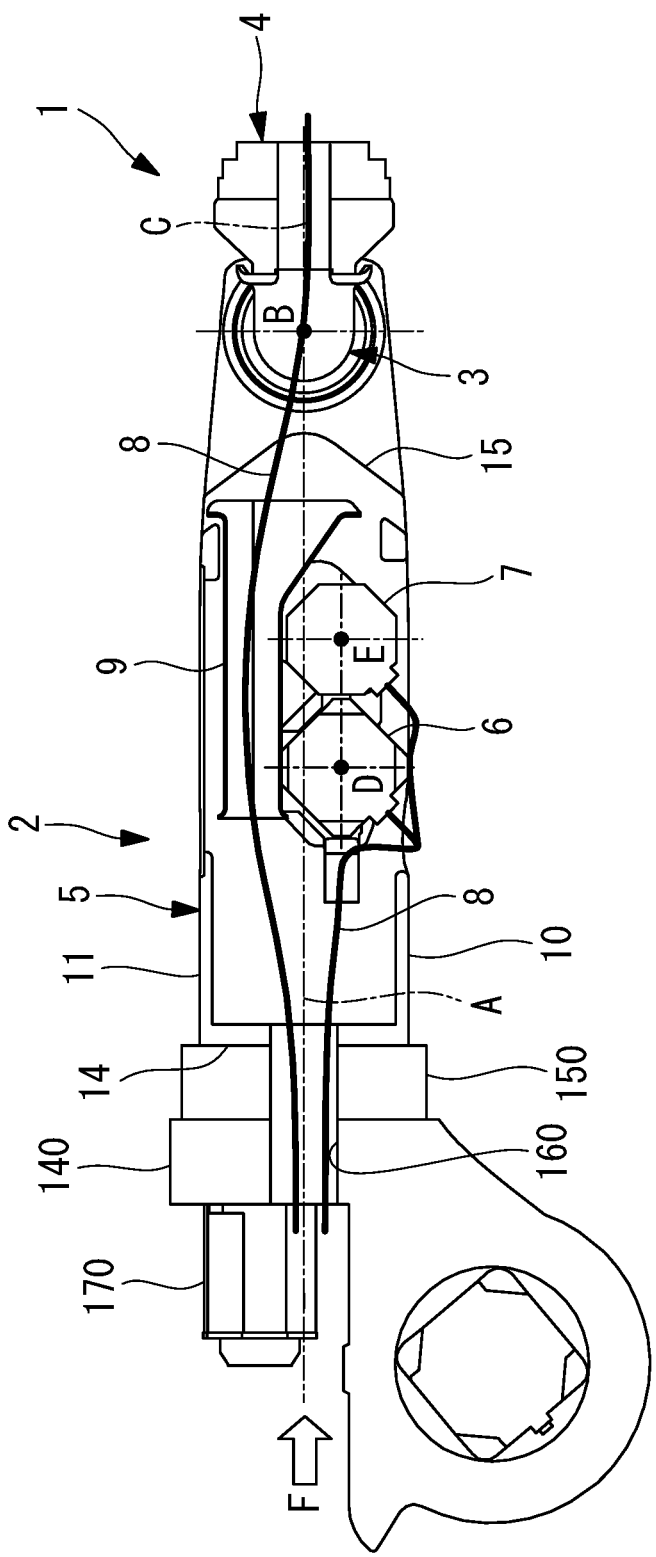
FIG. 10 is a longitudinal cross-sectional view showing a route of wiring in an internal space of the wrist structure in FIG. 3.

As shown in FIG. 10, as a result of disposing a longitudinal-direction intermediate position of the wiring 8, which enters the internal space of the first casing 5 from the back side of the second arm 140 via the hollow portion 160 and the through-hole 27 of the fifth side wall 14 and is guided toward the second wrist element 3 via the through-hole 28 of the sixth side wall 15, in the conduit member 9, the intermediate position of the wiring 8 extending along the first axis A is disposed along a curved route that bypasses the driving motors 6 and 7.

Figure 11:
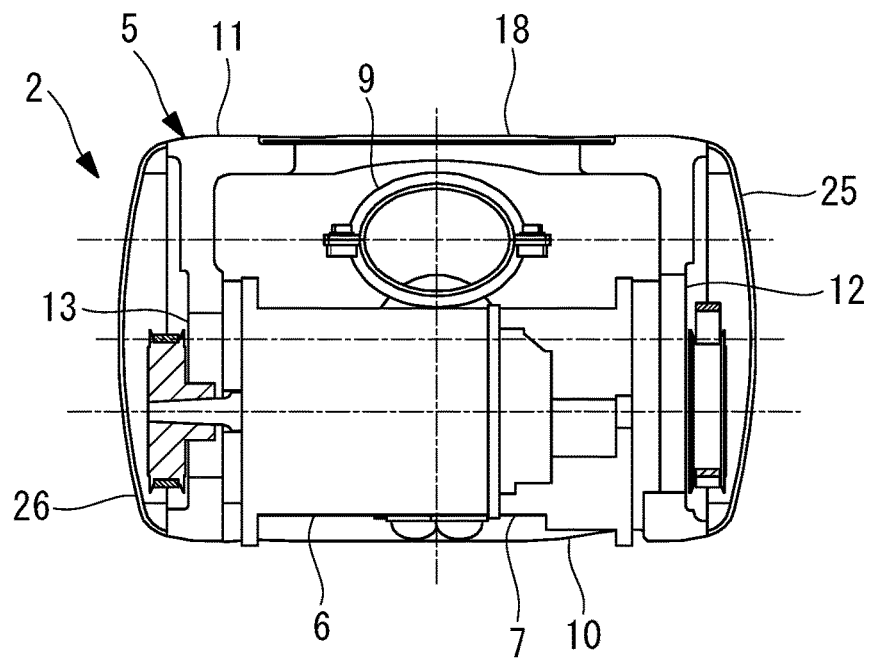
FIG. 11 is a lateral cross-sectional view showing a positional relationship between driving motors and a conduit member in the internal space of the wrist structure in FIG. 3.

By removing bolts, the conduit member 9 can be divided into two pieces in a radial direction along a dividing line that is parallel to the reference plane F, as shown in FIG. 11. By doing so, as a result of dividing the conduit member 9 via the second opening 17, it is possible to easily access the wiring 8, which passes through the interior of the conduit member 9, from the second opening 17.

As shown in FIG. 4, the second wrist element 3 is provided with a second casing 31 that is supported, by means of a structure in which both sides thereof are supported, by a reducer 29 and a bearing 30 in a rotatable manner about the second axis B with respect to the first casing 5. A reducer 32 that constitutes the third wrist element 4 is secured to a tip of a second casing 31. The second casing 31 and the reducer 32 are provided with through-holes 33 that pass therethrough along the third axis C. It is possible to make the wiring 8 that has reached outside the internal space of the first casing 5 via the through-hole 28 of the sixth side wall 15 pass through the through-holes 33 provided in the second casing 31 and the reducer 32, and it is possible to guide the wiring 8 to a tool (not shown) attached to the tip of the third wrist element 4.

As shown in FIG. 4, between the two driving motors 6 and 7, which are accommodated in the internal space of the first casing 5, and the second wrist element 3 and the third wrist element 4, motive-power transmitting mechanisms 34 and 41 that transmit the motive powers from the driving motors 6 and 7 are provided.

The motive-power transmitting mechanism 34 that transmits the motive power to the second wrist element 3 is provided with: a shaft 35 that is supported by the bearing 30 in a rotatable manner about the second axis B at the third side wall 12 of the first casing 5; a pulley 36 that is secured to the rotation shaft E of the driving motor 7; a pulley 37 that is secured to the shaft 35; and a belt 38 that is wound around the pulleys 36 and 37. A gear 40 that engages with an input-shaft gear 39 of the reducer 29 is provided at a tip of the shaft 35.

By doing so, the motive power from the driving motor 7 is transmitted to the shaft 35 via the pulleys 36 and 37 and the belt 38, and, as a result of the input-shaft gear 39 of the reducer 29 being rotated by the rotation of the shaft 35, the second wrist element 3 is rotated about the second axis B.

The motive-power transmitting mechanism 41 that transmits the motive power to the third wrist element 4 is provided with: a first shaft 43 that is supported by a bearing 42 in a rotatable manner about the second axis B at the fourth side wall 13 of the first casing 5; a first gear 44 provided in the first shaft 43; a second shaft 45 that is supported by the bearing 42 in a rotatable manner about an axis that is parallel to the third axis C at the second casing 31; a second gear 46 that is provided at one end of the second shaft 45 and that engages with the first gear 44; a third gear 48 that is provided at the other end of the second shaft 45 and that engages with an input-shaft gear 47 of the reducer 32; a pulley 49 that is secured to the rotation shaft D of the driving motor 6; a pulley 50 that is secured to the first shaft 43; and a belt 51 that is wound around the pulleys 49 and 50.

By doing so, the motive power from the driving motor 6 is transmitted to the first shaft 43 via the pulleys 49 and 50 and the belt 51 and is transmitted to the second shaft 45 by means of the engagement between the first gear 44 and the second gear 46, and, as a result of the input-shaft gear 47 of the reducer 32 being rotated by the rotation of the second shaft 45, an output shaft of the reducer 32, which serves as the third wrist element 4, is rotated about the third axis C.

The operation of the wrist structure 1 of the robot 100 according to this embodiment, thus configured, will be described below.

With the wrist structure 1 of the robot 100 according to this embodiment, because, in the internal space of the first casing 5, the driving motors 6 and 7 are disposed at positions displaced farther toward the first side wall 10 with respect to the reference plane F at the center, the driving motors 6 and 7 are close to the first opening 16 provided in the first side wall 10, and thus, there is an advantage in that it is easy to perform, via the first opening 16, operations for inserting and mounting the driving motors 6 and 7 into the internal space of the first casing 5, as well as an operation for removing the driving motors 6 and 7 from the internal space.

As a result of disposing the driving motors 6 and 7 so as to be displaced toward the first side wall 10, it is possible to dispose the wiring 8 in the space between the driving motors 6 and 7 and the second side wall 11. In other words, it is possible to directly access the wiring 8 disposed in the internal space of the first casing 5 via the second opening 17 provided in the second side wall 11, and thus, there is an advantage in that, regarding mounting of the wiring 8 or also a maintenance operation such as replacement thereof, it is possible to easily remove the driving motors 6 and 7. Because the conduit member 9 is secured in the space between the driving motors 6 and 7 and the second side wall 11, the wiring 8 does not come into contact with the second side wall 11, and the wiring 8 does not protrude outside the second side wall 11. Accordingly, it is possible to more easily execute off-line teaching by suppressing interference with peripheral equipment due to the protrusion of the wiring 8.

The wiring 8, which passes across the internal space of the first casing 5 in the direction along the first axis A from the through-hole 27 in the fifth side wall 14 of the first casing 5 to the through-hole 28 in the sixth side wall 15, follows the curved route bypassing the driving motors 6 and 7 at the intermediate position; however, as a result of displacing the driving motors 6 and 7 toward the first side wall 10, it suffices to mildly bend the wiring 8, as shown in FIG. 10.

Although the wiring 8 is displaced at the position at which the first wrist element 2, which rotates about the first axis A, is connected to the second arm 140 as a result of the rotation thereof, the wiring 8 does not receive a large load due to the rotation as a result of being made to pass through the vicinity of the first axis A. Although the wiring 8 is bent as a result of the rotation of the second wrist element 3 about the second axis B also at a position at the sixth side wall 15 extending toward the second wrist element 3 from the first casing 5, the load exerted on the wiring 8 is evenly distributed as a result of being made to pass through the through-hole 28 in the vicinity of the first axis A.

Also, as a result of mildly bending the wiring 8 in the internal space of the first casing 5, there is an advantage in that, when rotating the first wrist element 2 about the first axis A with respect to the second arm 140, it is possible to further reduce the load exerted on the wiring 8 by effectively absorbing the distortion that acts on the wiring 8.

Figure 12:
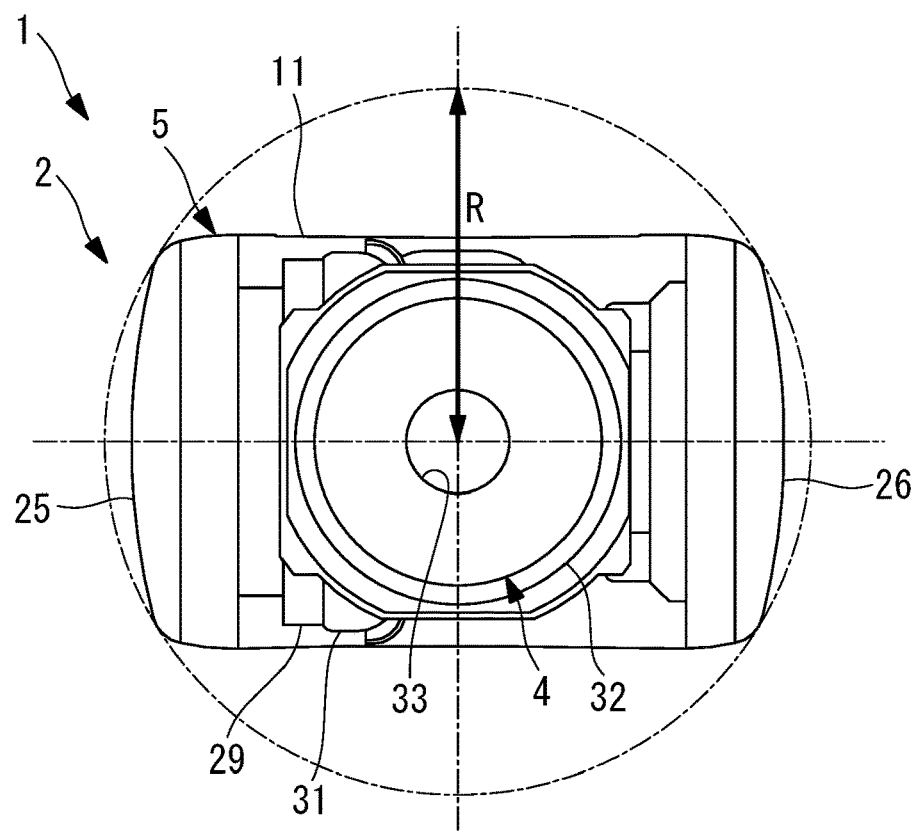
FIG. 12 is a front view of the wrist structure in FIG. 1.

In this embodiment, because the portions of the driving motors 6 and 7 protrude farther out toward the second side wall 11 with respect to the reference plane F in the internal space of the first casing 5 instead of the entire driving motors 6 and 7 being disposed farther toward the first side wall 10 with respect to the reference plane F, as compared with the case in which the entire driving motors 6 and 7 are disposed farther toward the first side wall 10 with respect to the reference plane F, as shown in FIG. 12, there is consequently an advantage in that it is possible to keep a wrist interference radius R, which is a maximum rotation radius about the first axis A, low by keeping the heights of the first casing 5 from the reference plane F on the two sides thereof low.

In this embodiment, because a tool is inserted into the internal space of the first casing 5 via the machining opening 23 in the third side wall 12 (or the fourth side wall 13) and the attachment surface 22 is machined in the inner surface of the fourth side wall 13 (or the third side wall 12), it is possible to manufacture the first casing 5 as a single component without having to divide the first casing 5. By doing so, it is possible to enhance the rigidity by reducing the number of components. It is not necessary to make the machining openings 23 and 24 large enough to allow the driving motors 6 and 7 to pass therethrough, and, as compared with the case in which the sizes thereof are large enough to allow the driving motors 6 and 7 to pass therethrough, it is possible to further reduce the distance between the two driving motors 6 and 7 in the first-axis-A direction. Furthermore, it suffices that the machining openings 23 and 24 have minimum required sizes for performing machining, and thus, it is possible to prevent the deterioration of the rigidity of the first casing 5 by keeping the sizes thereof smaller than the sizes of the attachment surfaces 21 and 22.

In this embodiment, although mechanisms provided with the pulleys 36, 37, 49, and 50 and the belts 38 and 51 have been described as examples of the motive-power transmitting mechanisms 34 and 41 that transmit the motive powers for driving the second wrist element 3 and the third wrist element 4 from the driving motors 6 and 7, there is no limitation thereto, and other arbitrary motive-power transmitting mechanisms, such as gears, may be employed.

In the case in which mechanisms provided with the pulleys 36, 37, 49, and 50 and the belts 38 and 51 are employed as the motive-power transmitting mechanisms 34 and 41, it is necessary to adjust tensile forces in the belts 38 and 51.

Figure 13:
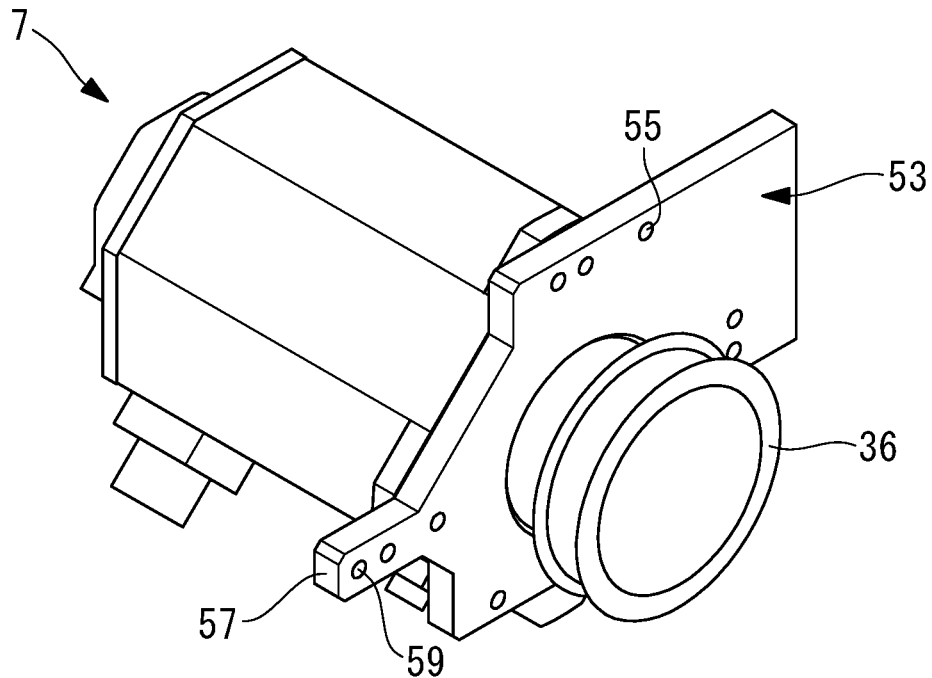
FIG. 13 is a perspective view showing a state in which an adaptor is attached to the driving motor for driving a second wrist element provided in the wrist structure in FIG. 1.
Figure 14:
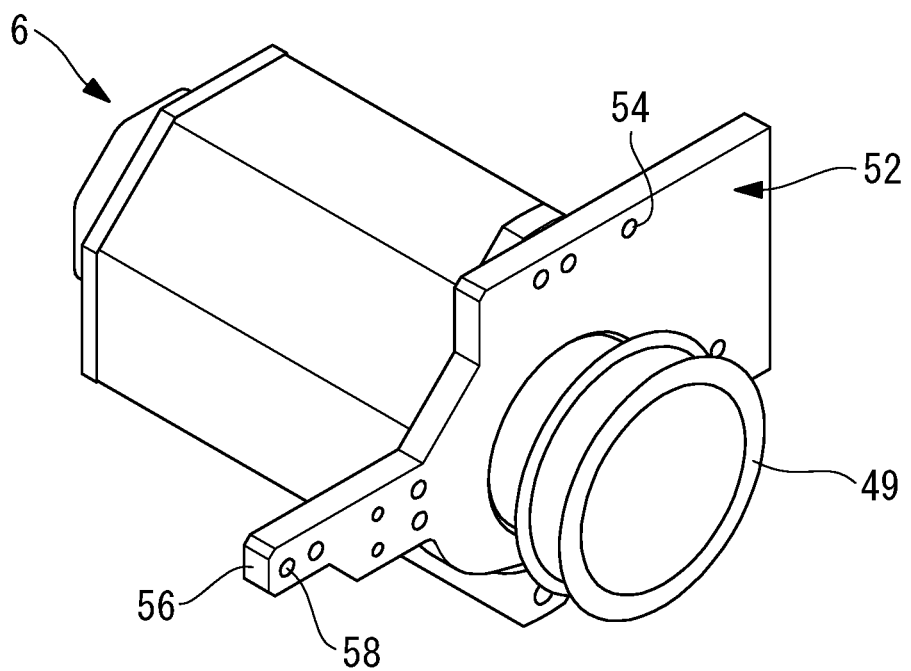
FIG. 14 is a perspective view showing a state in which an adaptor is attached to the driving motor for driving a third wrist element provided in the wrist structure in FIG. 1.
Figure 15:
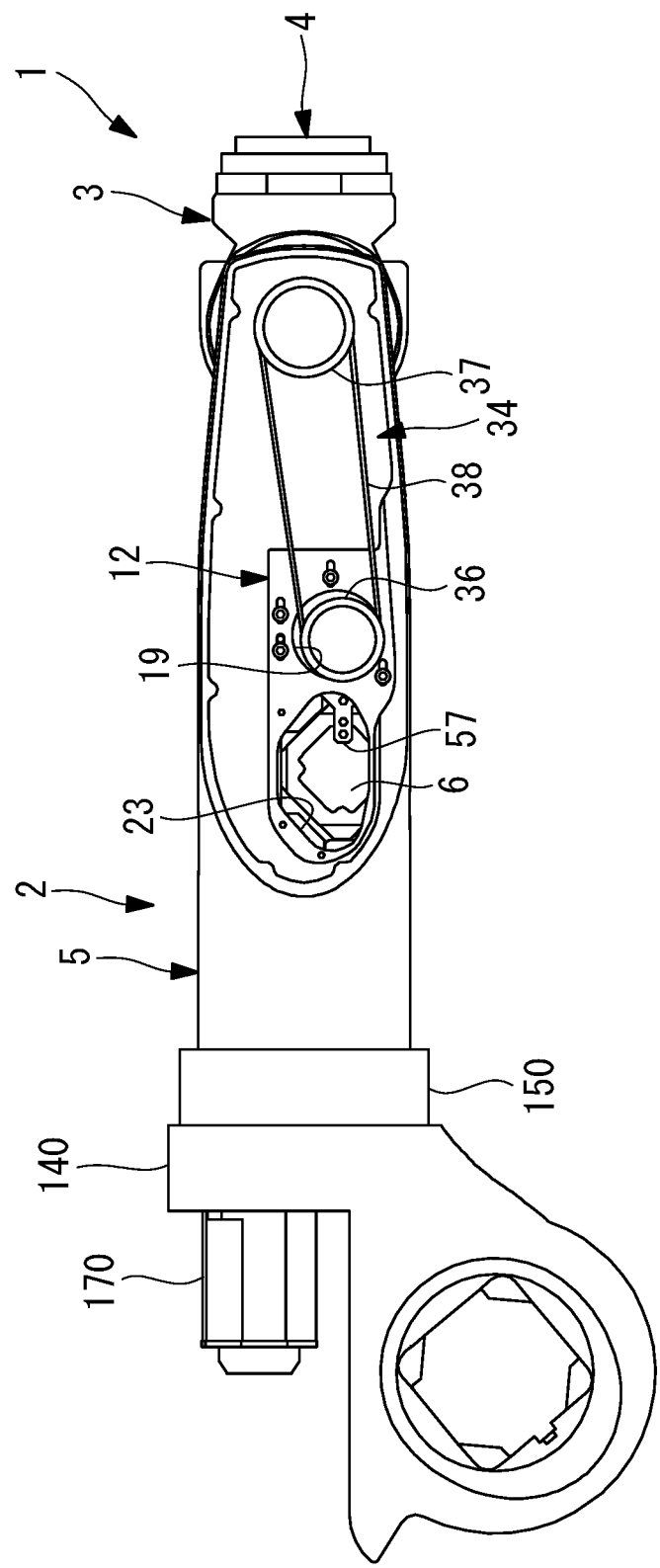
FIG. 15 is a side view showing an interface of the adaptor for the second wrist element, which is exposed at a machining opening in the wrist structure in FIG. 1.
Figure 16:
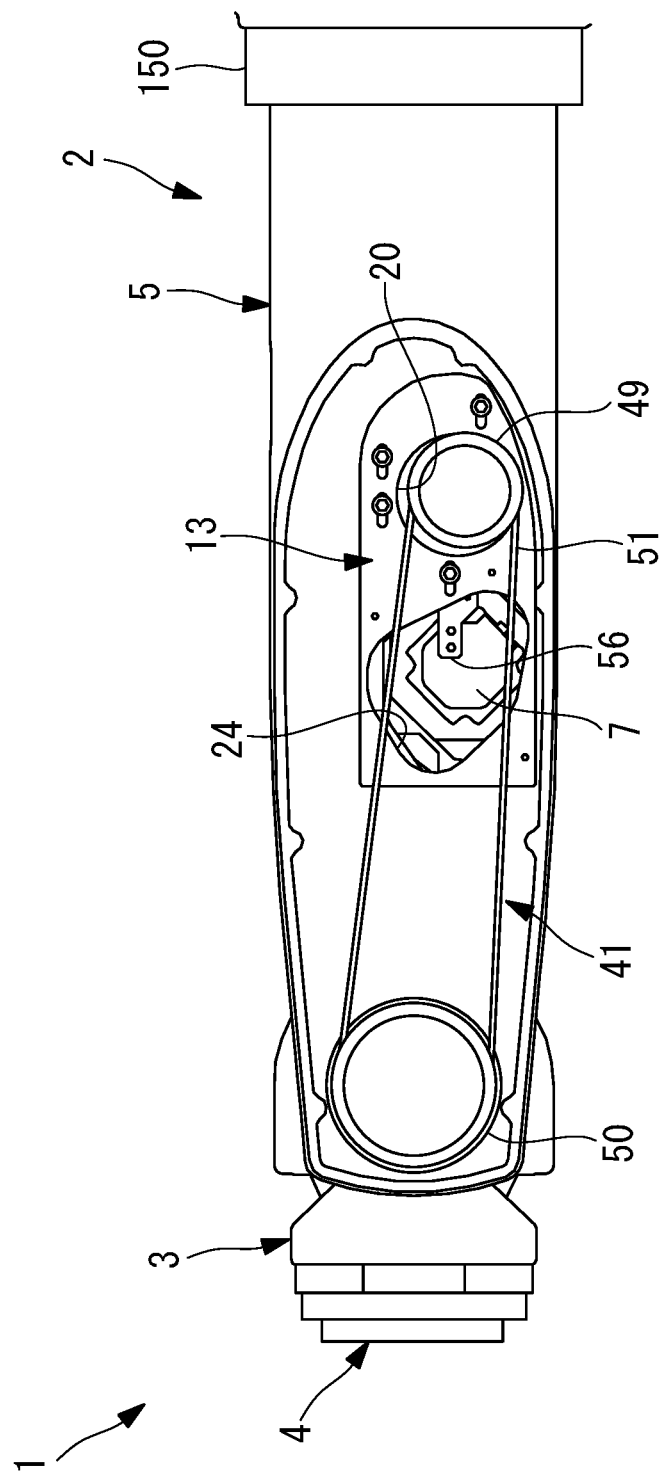
FIG. 16 is a side view showing the interface of the adaptor for the third wrist element, which is exposed at a machining opening in the wrist structure in FIG. 1.

For example, adaptors 52 and 53 are attached to the driving motors 6 and 7, as shown in FIGS. 13 and 14. The attachment surfaces 21 and 22 of the first casing 5 are provided with elongated holes extending in the first-axis-A direction, and the adaptors 52 and 53 are provided with screw holes 54 and 55 to which the bolts that have passed through the elongated holes are fastened. As shown in FIGS. 15 and 16, the adaptors 52 and 53 are provided with interfaces 56 and 57 that are exposed from the machining openings 23 and 24 when the driving motors 6 and 7 provided with the adaptors 52 and 53 are attached to the first casing 5. The interfaces 56 and 57 have two or more screw holes 58 and 59, and allow position-adjusting fixtures 60 and 61 to be secured to the adaptors 52 and 53 via the machining openings 23 and 24.

Figure 17:
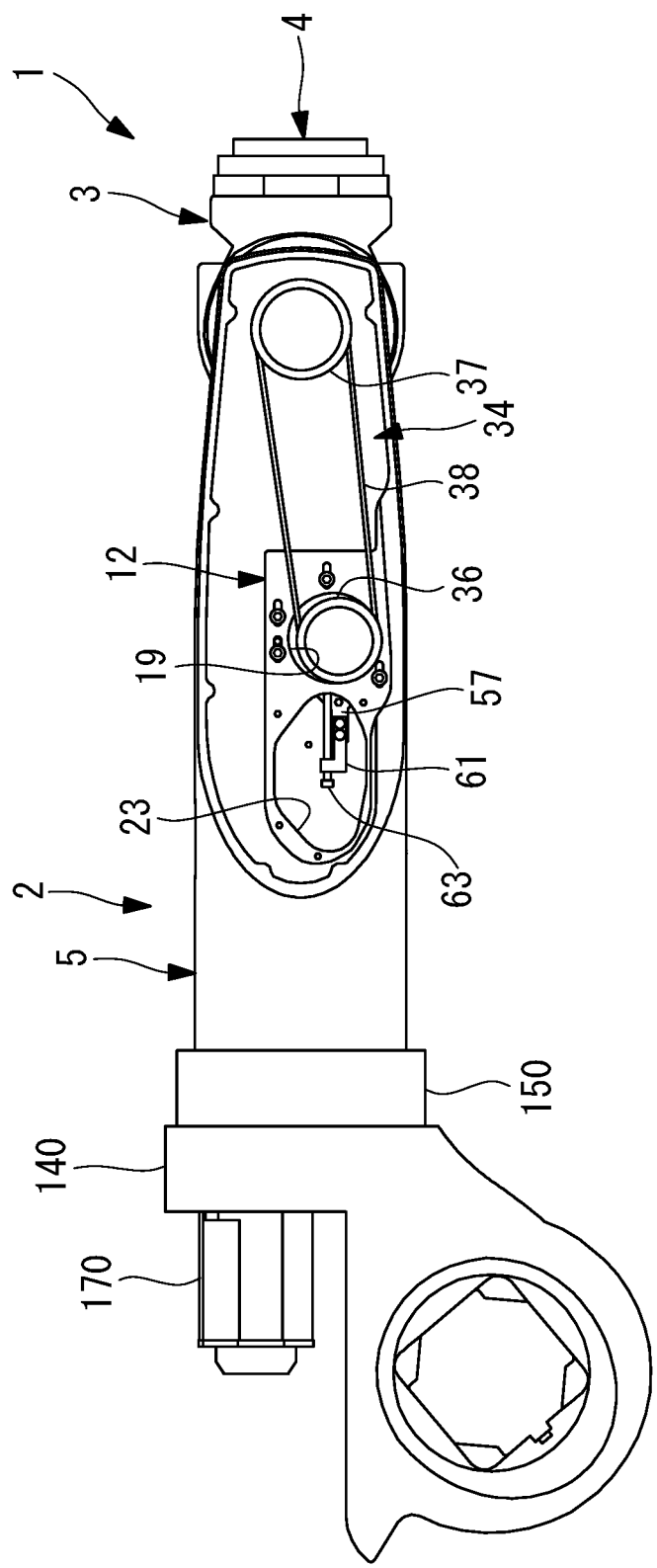
FIG. 17 is a diagram for explaining an operation for adjusting a tensile force in a belt in the case in which a position-adjusting fixture is attached to the interface in FIG. 15.
Figure 18:
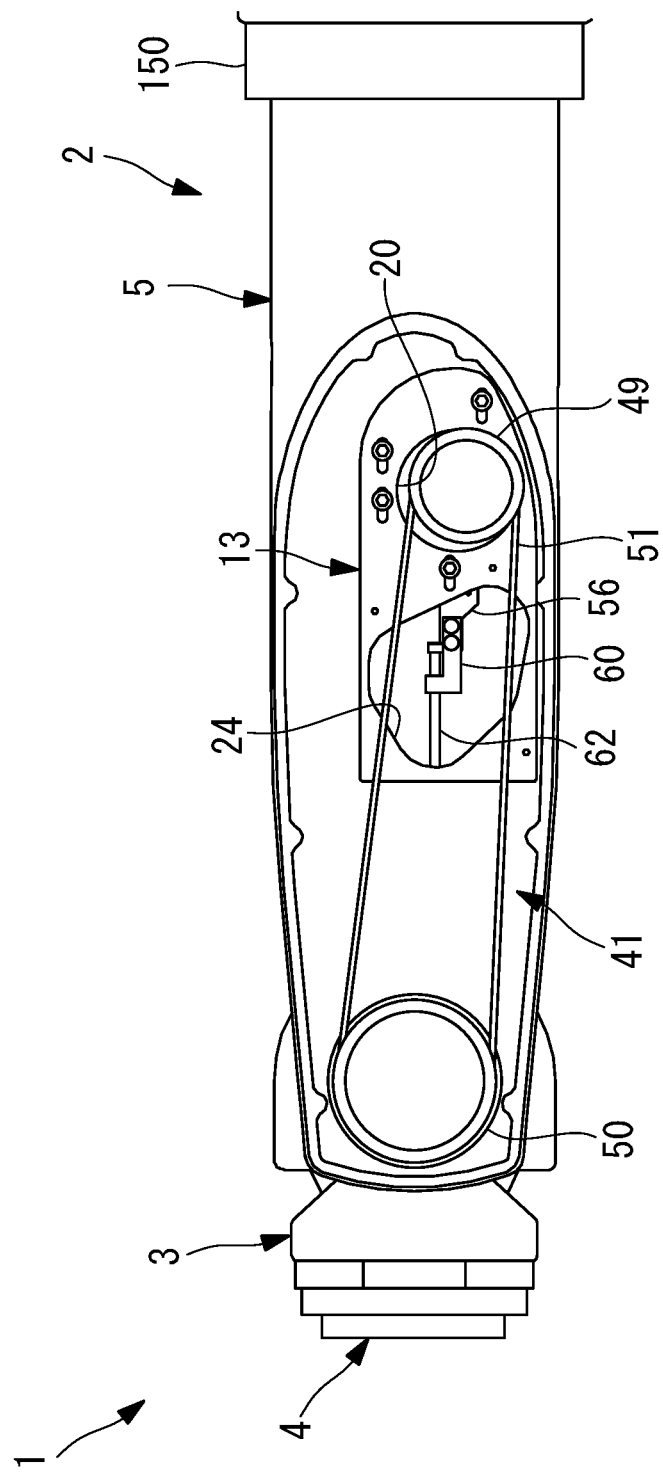
FIG. 18 is a diagram for explaining an operation for adjusting a tensile force in a belt in the case in which a position-adjusting fixture is attached to the interface in FIG. 16.

The position-adjusting fixtures 60 and 61 are, for example, L-shaped blocks that are secured to the interfaces 56 and 57 of the adaptors 52 and 53 by means of the bolts, as shown in FIGS. 17 and 18, and support bolts 62 and 63 in screw holes extending in directions parallel to the first axis A. The screw holes are disposed at positions at which inner surfaces of the machining openings 23 and 24 are aligned on extensions of the screw holes in the state in which the position-adjusting fixtures 60 and 61 are attached to the adaptors 52 and 53. As a result of screwing in the bolts 62 and 63 fastened to the screw holes, tips of the bolts 62 and 63 push the inner surface of the machining openings 23 and 24, and the adaptors 52 and 53 are moved in a direction in which reaction forces act, whereby making it possible to adjust the tensile forces in the belts 38 and 51.

In this embodiment, it is preferable that an area in the vicinity of the center of the internal space be included in a region that includes the two driving motors 6 and 7 and a region sandwiched between the two driving motors 6 and 7. In the vicinity of the position at which the second arm 140 is connected to the first wrist element 2, which rotates about the first axis A with respect to the second arm 140, it is more preferable that the wiring 8 pass through the vicinity of the first axis A, which serves as the center of rotation. In the vicinity of the second wrist element 3, which rotates with respect to the first wrist element 2, it is more preferable that the wiring 8 pass through the vicinity of the first axis A, which is the center of the rotational angle range of the second wrist element 3.

By doing so, as a result of the driving motors 6 and 7 being disposed in the vicinity of the center of the internal space, the conduit member 9 is also disposed in the vicinity of the center, and, in the vicinity of the center of the internal space, it is possible to reduce the burden exerted on the wiring 8 even if the wiring 8 bypasses the driving motors 6 and 7 by following a route that moves away from the first axis A.

In this embodiment, at least portions of the two driving motors 6 and 7 may be disposed so as to overlap in the first-axis-A direction.

By doing so, it is possible to reduce the distance between the two driving motors 6 and 7 in the first-axis-A direction. Because the length of the section in which the wiring 8 bypasses the driving motors 6 and 7 by following the route that moves away from the first axis A is reduced, it is possible to reduce the burden exerted on the wiring 8. Furthermore, it is possible to reduce the size of the conduit member 9 by suppressing the deterioration of the rigidity of the first casing 5 by reducing the size of the first opening 16 provided in the first side wall 10.

As a result, the following aspect is derived from the above described embodiment.

An aspect of the present invention is robot wrist structure including: a first wrist element that is supported at a tip of an arm of a robot in a rotatable manner about a first axis; a second wrist element that is supported at a tip of the first wrist element in a rotatable manner about a second axis that intersects the first axis; and a third wrist element that is supported at a tip of the second wrist element in a rotatable manner about a third axis that intersects the second axis, wherein the first wrist element is provided with a casing having a hollow structure, two driving motors that are accommodated in an internal space of the casing and that drive the second wrist element and the third wrist element, and a conduit member that allows, in the internal space, wiring to pass therethrough from an arm side to a second-wrist-element side in a direction along the first axis, a first opening and a second opening through which the internal space reaches the exterior are provided in a first side wall and a second side wall that are positioned on either side of a plane including the first axis and the second axis of the casing, the first opening is large enough to allow the driving motors to pass therethrough, centers of rotation shafts of the two driving motors are disposed between the first side wall and the plane, and the conduit member is disposed between the second side wall and the driving motor, and disposes the wiring in a curved route that bypasses the driving motors.

With this aspect, it is possible to accommodate the two driving motors in the internal space of the casing from the exterior via the first opening provided in the first side wall. In this case, the two driving motors are attached to the casing at positions at which the rotation shafts thereof are disposed between the plane including the first axis and the second axis and the first side wall. By doing so, because the driving motors are disposed so as to be displaced toward the first side wall in the internal space of the casing, a space is formed between the driving motors and the second side wall. Thus, it is possible to dispose the conduit member in the formed space.

Also, as a result of passing through the conduit member, the wiring, which enters the internal space from the arm-side and extends along the first axis to the second-wrist-element side, is disposed in the curved route that bypasses the two driving motors. In other words, in the vicinity of the position at which the arm is connected to the first wrist element, which rotates about the first axis with respect to the arm, it is preferable that the wiring pass through the vicinity of the first axis, which serves as the center of rotation, and, in the vicinity of the second wrist element, which rotates with respect to the first wrist element, and it is preferable that the wiring pass through the vicinity of the first axis, which is the center of the rotational angle range of the second wrist element. Also, in the vicinity of the center of the internal space, the burden exerted on the wiring is low even if the wiring bypasses the driving motors by following the route that moves away from the first axis.

With this aspect, as a result of the driving motors being disposed close to the first side wall, it is possible to enhance accessibility when mounting or replacing the driving motors via the first opening provided in the first side wall. As a result of the conduit member being disposed close to the second side wall, it is possible to perform mounting or maintenance of the wiring via the second opening provided in the second side wall without removing the driving motors, and thus, it is possible to enhance accessibility. Furthermore, because the conduit member is disposed between the second side wall and the driving motors, the wiring does not come into contact with the second side wall, and the wiring does not protrude outside from the second side wall. By doing so, it is possible to easily execute off-line teaching by suppressing interference with peripheral equipment due to protrusion of the wiring.

In the above-described aspect, portions of the driving motors may be disposed between the plane and the second side wall.

With this configuration, as compared with the case in which the driving motors are disposed in their entirety in the space between the plane including the first axis and the second axis and the first side wall, it is possible to reduce the protruding heights of the driving motors from the above-described plane. By doing so, it is possible to reduce the interference radius of the first wrist element about the first axis by reducing the size of the casing by also reducing the protruding height thereof.

In the above-described aspect, an area in the vicinity of the center of internal space may be included in a region that includes the two the driving motors and a region sandwiched between the two driving motors.

With this configuration, as a result of disposing the driving motors in the vicinity of the center of the internal space, the conduit member is also disposed in the vicinity of the center. Accordingly, in the vicinity of the center of the internal space, it is possible to reduce the burden exerted on the wiring even if the wiring bypasses the driving motors by following a route that moves away from the first axis.

In the above-described aspect, at least portions of the two driving motors may be disposed so as to overlap in a first-axis direction.

With this configuration, it is possible to reduce the distance between the two driving motors in the first-axis direction. By doing so, because the length of the section in which the wiring bypasses the driving motors by following a route that moves away from the first axis is reduced, it is possible to reduce the burden exerted on the wiring. Because it is possible to reduce the size of the first opening provided in the first side wall, it is possible to suppress the deterioration of the rigidity of the casing.

In the above-described aspect, the casing may support the second wrist element in a rotatable manner at two ends thereof in a second-axis direction.

With this configuration, it is possible to support the second wrist element with respect to the first wrist element with high rigidity by means of the structure in which both sides thereof are supported.

In the above-described aspect, a third side wall and a fourth side wall that are positioned on two sides of the casing in the second-axis direction may each be provided with an attachment surface to which one of the driving motors is attached, a through-hole through which the rotation shaft thereof passes, and a machining opening that is provided at a position facing the attachment surface for machining the attachment surface.

With this configuration, it is possible to attach the driving motors to the attachment surfaces by making the rotation shafts of the two driving motors accommodated in the internal space pass through the through-holes provided in the third side wall and the fourth side wall. As a result of machining the individual attachment surfaces from the machining openings provided at positions facing the attachment surfaces, it is possible to form the casing as a single component. Because it suffices that machining openings have minimum required sizes for performing machining, it is possible to prevent the deterioration of the rigidity of the casing by reducing the opening areas to the minimum required areas.

Because it is possible to accommodate the two driving motors in the internal space of the casing from the exterior via the first opening provided in the first side wall from the exterior, it is not necessary for the machining openings to be large enough to allow the driving motors to pass therethrough. Accordingly, as compared with the case in which the machining openings are large enough to allow the driving motors to pass therethrough, it is possible to further reduce the distance between the two driving motors in the first axis direction.

As a result of disposing at least portions of the driving motors so as to overlap in the first axis direction, it is possible to suppress the deterioration of the rigidity of the casing by reducing the size of the first opening provided in the first side wall, and to reduce the size of the conduit member.

In the above-described aspect, a pulley around which a belt for driving the second wrist element or the third wrist element is wound may be secured to the rotation shaft of at least one of the driving motors, a position of the driving motor can be adjusted in directions in which a tensile force applied to the belt along the attachment surface is changed, and the driving motor may be provided with an interface that allows a position-adjusting fixture to be attached to the driving motor via the machining opening formed in the side wall that is the same as that provided with the attachment surface.

With this configuration, it is possible to adjust the tensile force exerted on the belt wound around the pulley by moving the driving motor along the attachment surface by attaching, via the machining opening, the position-adjusting fixture to the interface provided in the driving motor.

REFERENCE SIGNS LIST 1 wrist unit (wrist structure)
2 first wrist element
3 second wrist element
4 third wrist element
5 first casing (casing)
6, 7 driving motor
8 wiring
9 conduit member
10 first side wall
11 second side wall
12 third side wall
13 fourth side wall
16 first opening
17 second opening
19, 20 through-hole
21, 22 attachment surface
23, 24 machining opening
36, 37, 49, 50 pulley
38, 51 belt
56, 57 interface
100 robot
60, 61 position-adjusting fixture
140 second arm (arm)
A first axis
B second axis
C third axis
D, E rotation axis
F reference plane

The invention claimed is:

1. A robot wrist structure comprising:
a first wrist element that is supported at a tip of an arm of a robot in a rotatable manner about a first axis;
a second wrist element that is supported at a tip of the first wrist element in a rotatable manner about a second axis that intersects the first axis;
a third wrist element that is supported at a tip of the second wrist element in a rotatable manner about a third axis that intersects the second axis;
wherein the first wrist element is provided with a casing having a hollow structure, two driving motors that are accommodated in an internal space of the casing and that drive the second wrist element and the third wrist element, and a conduit member that allows, in the internal space, wiring to pass therethrough from an arm side to a second-wrist-element side in a direction along the first axis;
a first opening and a second opening through which the internal space reaches the exterior are provided in a first side wall and a second side wall that are positioned on either side of a plane including the first axis and the second axis of the casing;
the first opening is large enough to allow the driving motors to pass therethrough,
centers of rotation shafts of the two driving motors are disposed between the first side wall and the plane; and
the conduit member is disposed between the second side wall and the driving motor, and disposes the wiring in a curved route that bypasses the driving motors.

2. The robot wrist structure according to claim 1, wherein portions of the driving motors are disposed between the plane and the second side wall.

3. The robot wrist structure according to claim 1, wherein an area in the vicinity of the center of the internal space is included in a region that includes the two driving motors and a region sandwiched between the two driving motors.

4. The robot wrist structure according to claim 1, wherein at least portions of the two driving motors are disposed so as to overlap in a first-axis direction.

5. The robot wrist structure according to claim 1, wherein the casing supports the second wrist element in a rotatable manner at two ends thereof in a second-axis direction.

6. The robot wrist structure according to claim 1, wherein a third side wall and a fourth side wall that are positioned on two sides of the casing in the second-axis direction are each provided with an attachment surface to which one of the driving motors is attached, a through-hole through which the rotation shaft thereof passes, and a machining opening that is provided at a position facing the attachment surface for machining the attachment surface.

7. The robot wrist structure according to claim 6, wherein:
a pulley around which a belt for driving the second wrist element or the third wrist element is wound is secured to the rotation shaft of at least one of the driving motors;
a position of the driving motor can be adjusted in directions in which a tensile force applied to the belt along the attachment surface is changed; and
the driving motor is provided with an interface that allows a position-adjusting fixture to be attached to the driving motor via the machining opening formed in the side wall that is the same as that provided with the attachment surface.

* * * * *